(12) United States Patent
Nowack et al.

(10) Patent No.: US 11,539,601 B2
(45) Date of Patent: *Dec. 27, 2022

(54) SYSTEM AND METHOD FOR PROVIDING COMMUNICATION PLATFORM METADATA

(71) Applicant: Twilio Inc., San Francisco, CA (US)

(72) Inventors: Matthew David Nowack, San Bruno, CA (US); Jonas Mikael Boerjesson, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,479

(22) Filed: Aug. 20, 2019

(65) Prior Publication Data

US 2020/0153717 A1 May 14, 2020

Related U.S. Application Data

(63) Continuation of application No. 15/815,403, filed on Nov. 16, 2017, now Pat. No. 10,439,907, which is a
(Continued)

(51) Int. Cl.
*H04L 43/065* (2022.01)
*H04L 43/06* (2022.01)
(Continued)

(52) U.S. Cl.
CPC .............. *H04L 43/065* (2013.01); *H04L 9/40* (2022.05); *H04L 43/04* (2013.01); *H04L 43/06* (2013.01);
(Continued)

(58) Field of Classification Search
CPC ... H04L 43/065; H04L 43/04; H04L 65/1006; H04L 67/02; H04L 29/06; H04L 43/06; H04L 69/08; H04L 65/1069; H04W 4/14
See application file for complete search history.

(56) References Cited

U.S. PATENT DOCUMENTS

| 5,274,700 A | 12/1993 | Gechter et al. |
| 5,526,416 A | 6/1996 | Dezonno et al. |
| (Continued) |

FOREIGN PATENT DOCUMENTS

| DE | 1684587 A1 | 3/1971 |
| EP | 0282126 A2 | 9/1988 |
| (Continued) |

OTHER PUBLICATIONS

"Aepona's API Monetization Platform Wins Best of 4G Awards for Mobile Cloud Enabler", 4G World 2012 Conference & Expo, [Online]. [Accessed Nov. 5, 20155]. Retrieved from the Internet: <URL: https://www.realwire.com/releases/%20Aeponas-API-Monetization>, (Oct. 30, 2012), 4 pgs.
(Continued)

*Primary Examiner* — Thai Nguyen
(74) *Attorney, Agent, or Firm* — Schwegman Lundberg & Woessner, P.A.

(57) ABSTRACT

A system and method that includes executing communication processes in an application platform, which comprises on behalf of outside entities, negotiating communications between a set of internal resources and at least one external resource using at least a first communication protocol and a second protocol; capturing internal log information during execution of the application platform; receiving a request to access log information by an outside entity; synthesizing the internal log information of the first protocol and at least a second protocol into a unified communication report; and transmitting the unified communication report.

20 Claims, 14 Drawing Sheets

Related U.S. Application Data continuation of application No. 14/838,149, filed on Aug. 27, 2015, now Pat. No. 9,853,872, which is a continuation of application No. 14/488,802, filed on Sep. 17, 2014, now Pat. No. 9,137,127.

(60) Provisional application No. 61/879,023, filed on Sep. 17, 2013.

(51) Int. Cl.
  *H04L 69/08* (2022.01)
  *H04L 67/02* (2022.01)
  *H04L 9/40* (2022.01)
  *H04L 65/1104* (2022.01)
  *H04L 43/04* (2022.01)
  *H04W 4/14* (2009.01)
  *H04L 65/1069* (2022.01)

(52) U.S. Cl.
  CPC .......... *H04L 65/1104* (2022.05); *H04L 67/02* (2013.01); *H04L 69/08* (2013.01); *H04W 4/14* (2013.01); *H04L 65/1069* (2013.01)

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |

(56) References Cited

U.S. PATENT DOCUMENTS

| | | |
|---|---|---|
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |

(56) References Cited

U.S. PATENT DOCUMENTS

| | | |
|---|---|---|
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,032,204 B2 | 5/2015 | Byrd et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Woithuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Woithuis et al. |
| 9,632,875 B2 | 4/2017 | Raichstein et al. |
| 9,634,995 B2 | 4/2017 | Binder |
| 9,853,872 B2 | 12/2017 | Nowack et al. |
| 10,439,907 B2 | 10/2019 | Nowack et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hilimer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0169859 A1* | 9/2003 | Strathmeyer ..... H04L 29/12207 379/88.17 |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |

(56) References Cited

U.S. PATENT DOCUMENTS

| | | |
|---|---|---|
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0222131 A1 | 9/2009 | Chen et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0282036 A1* | 11/2009 | Fedtke ............... G06F 21/6254 |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2009/0319588 A1* | 12/2009 | Gandhi ............... G06F 21/6254 |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |

(56) References Cited

U.S. PATENT DOCUMENTS

| | | |
|---|---|---|
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0029191 A1 | 11/2010 | Sanding et al. |
| 2010/0281108 A1 | 11/2010 | Cohen |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0014981 A1 | 6/2011 | Koren et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149950 A1 | 6/2011 | Petit-Huguenln et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0277034 A1* | 11/2011 | Hanson ............... G06F 21/554 709/224 |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseeian et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hili et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0265805 A1* | 10/2012 | Samdadiya ......... G06F 11/3466 709/203 |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |

(56) References Cited

U.S. PATENT DOCUMENTS

| | | |
|---|---|---|
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0372889 A1 | 12/2015 | Nowack et al. |
| 2015/0381580 A1 | 12/2015 | Graham, III et al. |
| 2016/0001758 A1 | 1/2016 | Sugio |
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster |
| 2016/0234391 A1 | 8/2016 | Wolthuis et al. |
| 2016/0239770 A1 | 8/2016 | Batabyal et al. |
| 2017/0339283 A1 | 11/2017 | Chaudhary et al. |
| 2018/0069772 A1 | 3/2018 | Nowack et al. |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 14/488,802, Notice of Allowance dated May 8, 2015", 14 pgs.

"U.S. Appl. No. 14/488,802, Response filed Feb. 25, 2015 to Restriction Requirement dated Feb. 4, 2015", 6 pgs.

"U.S. Appl. No. 14/488,802, Restriction Requirement dated Feb. 4, 2015", 9 pgs.

"U.S. Appl. No. 14/838,149, Corrected Notice of Allowance dated Sep. 28, 2017", 2 pgs.

"U.S. Appl. No. 14/838,149, Examiner Interview Summary dated Aug. 8, 2017", 3 pgs.

"U.S. Appl. No. 14/838,149, Non Final Office Action dated May 16, 2017", 10 pgs.

"U.S. Appl. No. 14/838,149, Notice of Allowance dated Aug. 16, 2017", 6 pgs.

"U.S. Appl. No. 14/838,149, Response filed Aug. 4, 2017 to Non Final Office Action dated May 16, 2017", 8 pgs.

"U.S. Appl. No. 15/815,403, Non Final Office Action dated Jan. 2, 2019", 15 pgs.

"U.S. Appl. No. 15/815,403, Notice of Allowance dated May 20, 2019", 8 pgs.

"U.S. Appl. No. 15/815,403, PTO Response to Rule 312 Communication dated Sep. 4, 2019", 2 pgs.

"U.S. Appl. No. 15/815,403, Response filed May 6, 2019 to Non Final Office Action dated Jan. 2, 2019", 11 pgs.

"Archive Microsoft Office 365 Email I Retain Unified Archiving", GWAVA, Inc., Montreal, Canada, [Online] Retrieved from the Internet: <URL: http://www.gwava.com/Retain/Retain for_Office_365.php>, (2015), 4 pgs.

"Complaint for Patent Infringement", *Telinit Technologies, LLC v. Twilio Inc* 2:12-cv-663, (Oct. 12, 2012), 17 pgs.

"Ethernet to Token ring Bridge", Black Box Corporation, [Online] Retrieved from the Internet: <URL: http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

U.S. Appl. No. 14/488,802 U.S. Pat. No. 9,137,127, filed Sep. 17, 2014, System and Method for Providing Communication Platform Metadata.

U.S. Appl. No. 14/838,149 U.S. Pat. No. 9,853,872, filed Aug. 27, 2015, System and Method for Providing Communication Platform Metadata.

U.S. Appl. No. 15/815,403 U.S. Pat. No. 10,439,907, filed Nov. 16, 2017, System and Method for Providing Communication Platform Metadata.

* cited by examiner

S160

| | Search |

Errors
46bdsj347e26159 21-JUN 3:15
dhnkwuihdfhw89s 21-JUN 3:12
nxjsdoiucnw8jdfjw 20-JUN 23:45
shjdjksjksksjfjghsj 20-JUN 23:42
cnweio49ckj29isis 20-JUN 23:42
10 more

Warnings
jksd98w4jkdhjsjkd 21-JUN 3:15
cnds9ewnjdjksisdf 20-JUN 23:12
cnw8389dkjhsjkdjs 20-JUN 16:45
shjdfiuwiucdjjdjwui 20-JUN 10:42
3897234uhhe89hf 20-JUN 03:42
22 more

History
dhoiewoijkdlsnsids 21-JUN 3:45
honcncxrhks9iewq 21-JUN 3:45
34934jionro3c0uur 21-JUN 3:45
4389e98hr9r398rh 21-JUN 3:45
2372ehuhd73d23w 21-JUN 3:45
89u9jef9erh9ghgh 21-JUN 3:45
3475hfhnutkxnqlof 21-JUN 3:45
4kcmasn1y4860ds 21-JUN 3:45
100+ more

FIGURE 4

Session: 46bdsj347e26159bc46e2ffsc6a481
13:34:16 PDT 2014-09-10

Expand All

▶ SIP: INVITE from <Caller>

▶ SIP: 100 Trying from <Caller>

▶ SIP: 180 Ringing from <Caller>

▶ HTTP: GET http://www.example.com/phoneApp/

▶ SIP: 183 Session Progress to <Caller>

SYSTEM AND METHOD FOR PROVIDING COMMUNICATION PLATFORM METADATA

CROSS-REFERENCE TO RELATED APPLICATIONS

This application is a continuation of U.S. patent application Ser. No. 15/815,403, filed 16 Nov. 2017, which is a continuation of U.S. patent application Ser. No. 14/838,149, filed 27 Aug. 2015, which is a continuation of U.S. patent application Ser. No. 14/488,802, filed 17 SEP 2014, which claims the benefit of U.S. Provisional Application Ser. No. 61/879,023, filed on 17 Sep. 2013, all of which are incorporated in their entirety by this reference.

TECHNICAL FIELD

This invention relates generally to the communication platform field, and more specifically to a new and useful system and method for providing communication platform metadata in the communication platform field.

BACKGROUND

Application platforms are frequently used by other applications and services to supplement or facilitate particular interactions and functionality. The application platforms, in many cases, do not expose logs and analytics about internal platform operations and events. Such information in some cases contains sensitive information. Not only would exposing the logs be a potential security vulnerability to the application platform, but also extracting useful information from the application platform logs would be challenging. In a more specific scenario, communication platforms have numerous challenges in debugging and identifying errors due to dependence on various communication resources internal and external. A user of a communication platform may encounter an error as a result of misconfiguration of their system, of the communication platform, a communication provider, or a particular endpoint participating in a communication. Thus, there is a need in the communication platform field to create a new and useful system and method for providing sanitized platform metadata. This invention provides such a new and useful system and method.

BRIEF DESCRIPTION OF THE FIGURES

FIG. 4 is a schematic representation of an exemplary log report interface;

FIGS. 9A and 9B is an exemplary representation of a unified log report interface;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Providing Communication Platform Metadata

A system for providing communication platform metadata of a preferred embodiment can include a multitenant platform system 110, an internal log storage system 120, a log sanitizer 130, and exposed log interface 140. The system functions to clean, organize, and otherwise synthesize event logs, resource metadata, and/or any suitable internal records such that they can be consumed by outside entities in a secure and useful manner. The system preferably exposes event logs across multiple operation modes and more specifically communication modes. Event information of two or more communication protocols as controlled by a communication platform can be exposed. For example, the SIP communication or IP communication protocols can be contextualized with synchronous alignment with application level communication over HTTP or other suitable protocols. The system can be used in exposing routing event logs that abstract out internal information and events of the platform. The system can also be used in processing logs of the system and presenting analysis and classification of the event logs. This can enable improved debugging, analytics, and/or operational insight into use of an application platform by an outside entity.

Figure 1:
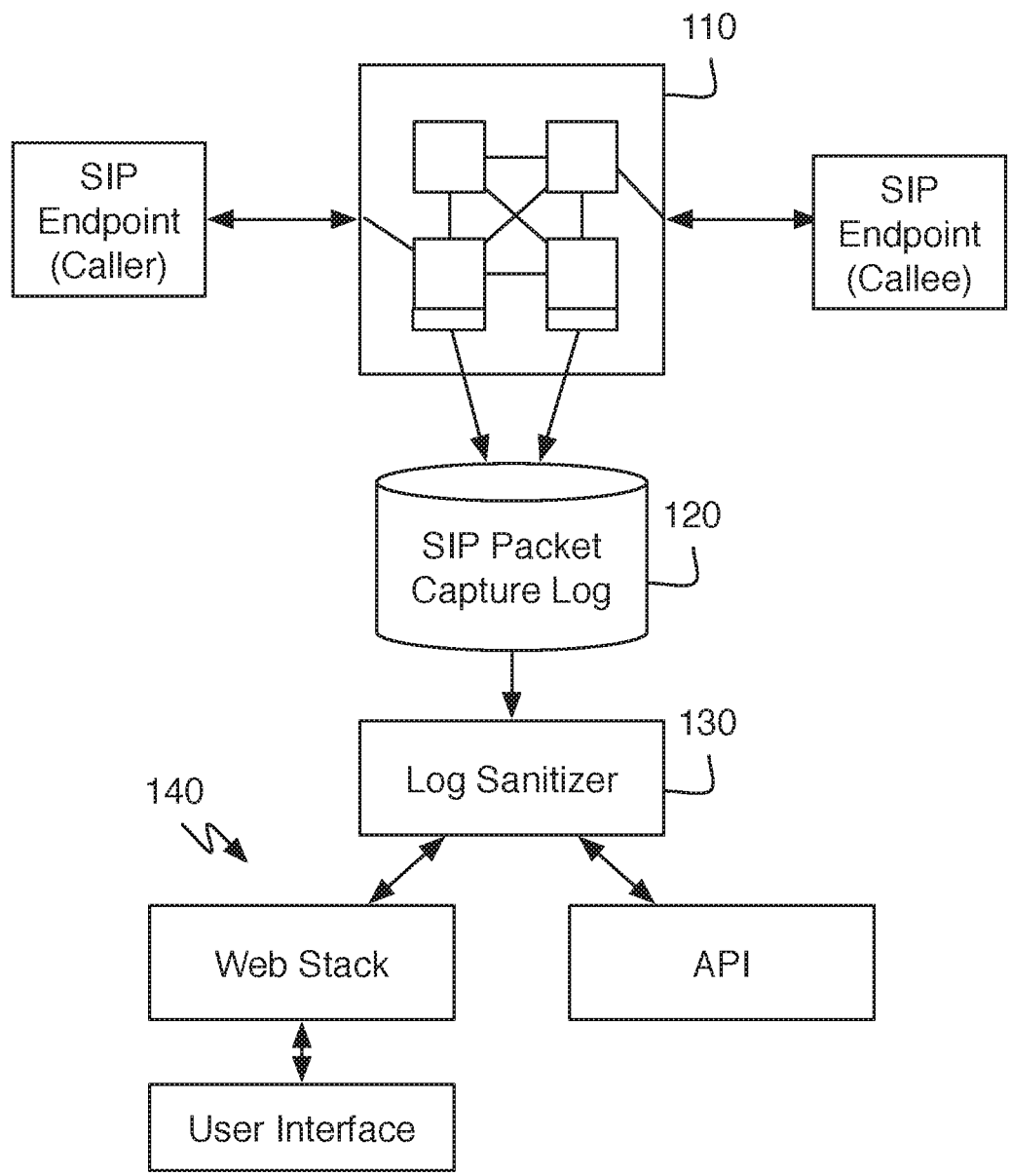
FIG. 1 is a schematic representation of a system for providing sanitized platform metadata of routed communication.
Figure 2:
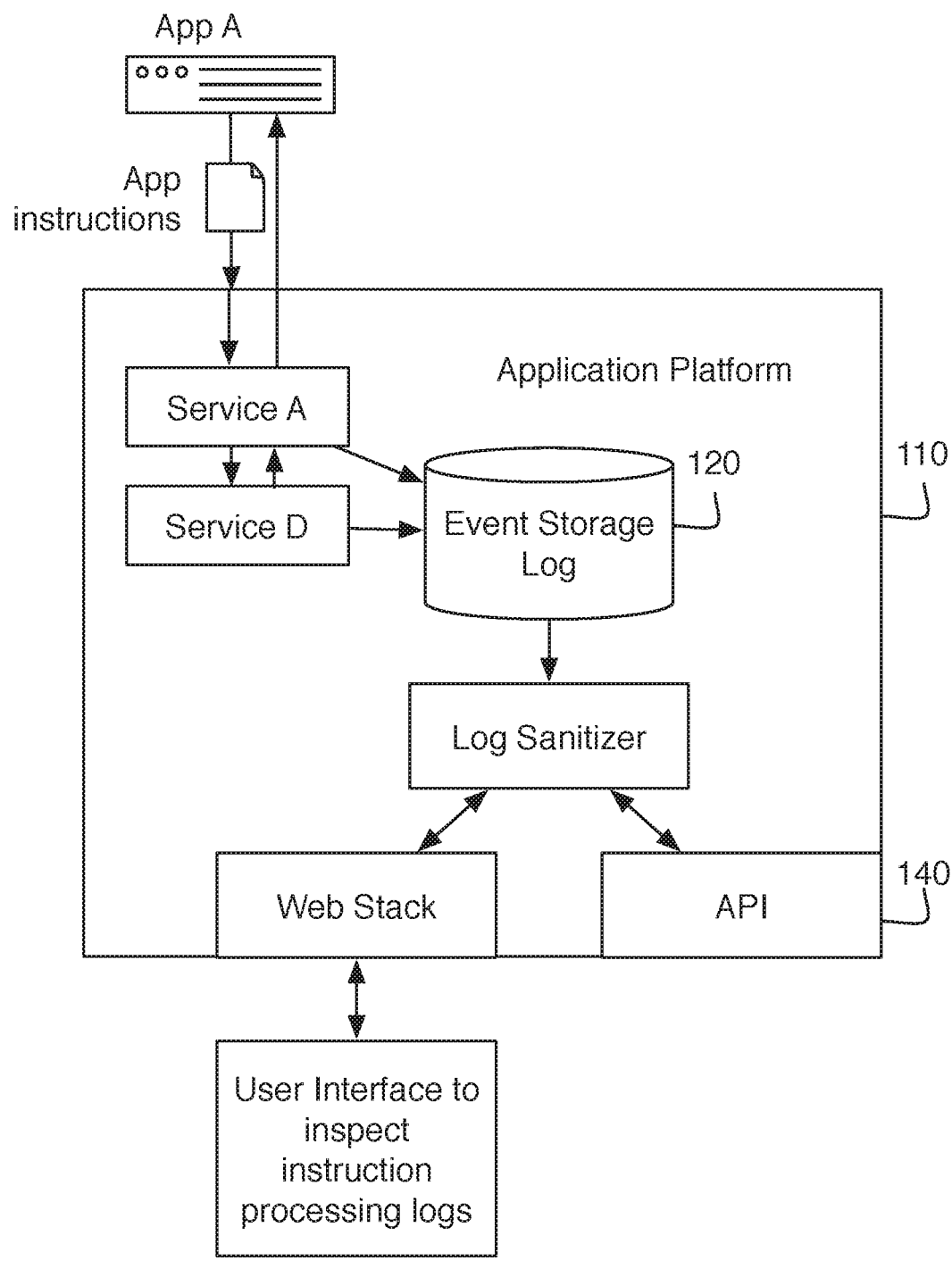
FIG. 2 is a schematic representation of a system for providing sanitized platform metadata of application processing.
Figure 3:
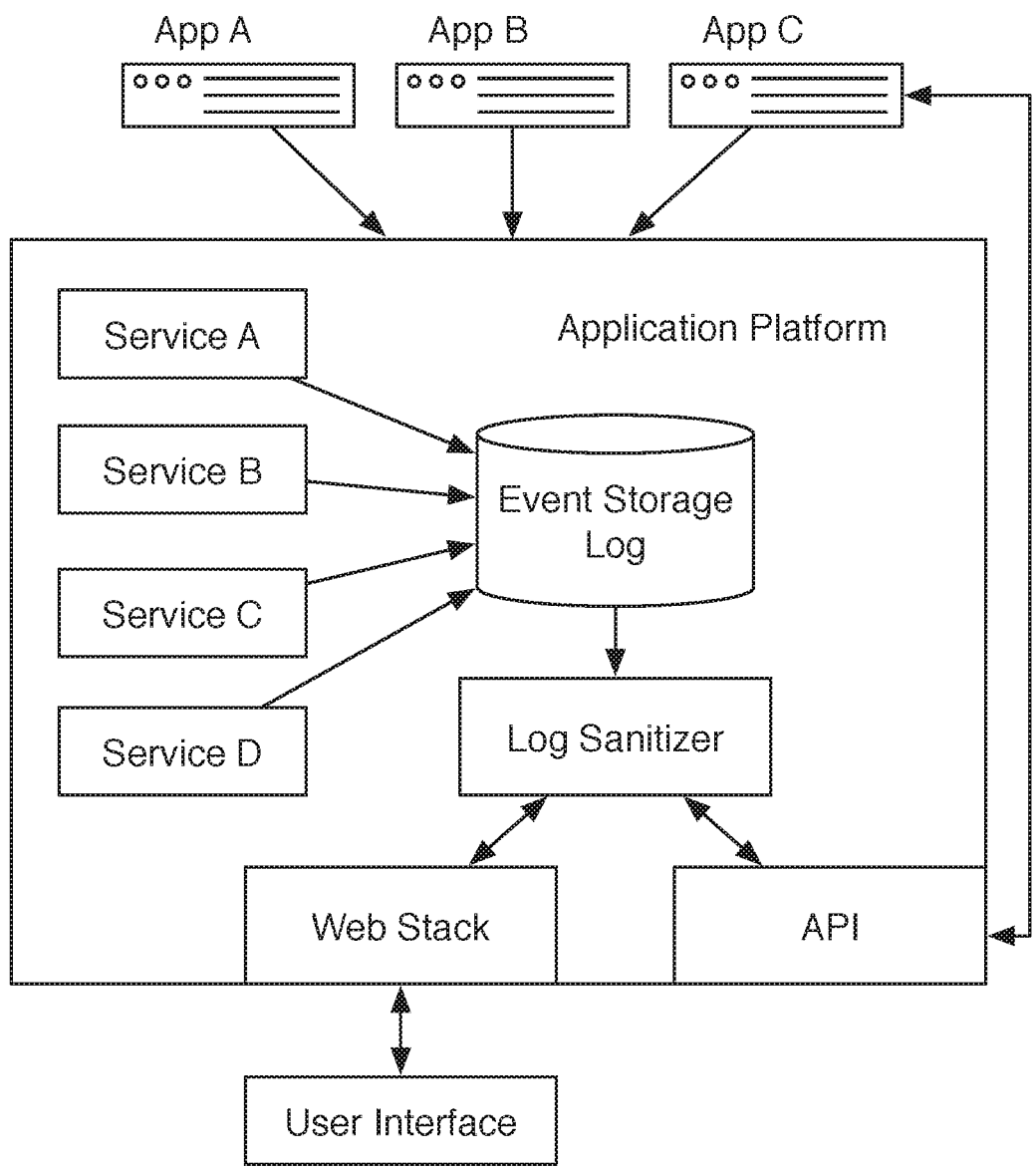
FIG. 3 is a schematic representation of a system for providing sanitized platform metadata of platform resources.

The system in a first implementation is used by a communication platform in sanitizing packets and communication messages with at least one outside entity as shown in FIG. 1. The system can additionally or alternatively be applied to operational trace logs of actions performed by the application platform no as shown in FIG. 2. In a third implementation, the system can be applied to metadata of accessible resources of the communication platform. The accessible resources can be accessible over an API, such as a REST API, or through an application programming interface (API) as shown in FIG. 3.

The multitenant platform system no of the preferred embodiment functions to perform some task or service on behalf of an outside entity and generate metadata relating to the performed operations. Preferably, the application platform 110 is a multitenant, distributed computing system providing an application programming interface (API). The API preferably operates over an application layer protocol such as HTTP, HTTPS, SPDY or any suitable protocol. The platform can provide a processing service, a communication service, a media service, resource service, and/or any suitable type of service. A communication service can facilitate or manage synchronous or asynchronous communication involving at least one outside endpoint. The application platform 110 preferably provides a service used by outside applications or devices.

An exemplary communication service can include bridging synchronous voice session over a SIP service. An exemplary processing service can include executing application instructions within the application platform 110. The multitenant platform 110 is substantially similar to the telephony application platform described in patent application Ser. No. 12/417,630 filed 2 Apr. 2009, entitled "System and Method for Processing Telephony Sessions", which is hereby incorporated in its entirety by this reference. A telephony or communication application platform 110 can enable synchronous communication sessions such as voice sessions, video sessions, screen sharing sessions, or any suitable synchronous form of media communication. The communication can be carried out over PSTN channels, SIP channels, IP-based channels, WebRTC, or any suitable communication protocol. The communication application platform 110 can similarly facilitate asynchronous communication such as SMS, MMS, IP-based client application messaging, proprietary platform messaging (e.g., social network messaging), or any suitable form of asynchronous communication. The application platform 110 may alternatively provide any suitable service or be any suitable type of platform.

A telephony application platform 110 preferably includes the combination of a communication based signaling and media protocol that is used for facilitating communication sessions. The telephony application platform 110 will preferably utilize a first protocol such as SIP or any suitable communication protocol. The first protocol is preferably a communication protocol that facilitates initiating an interactive media session (e.g., voice, video, chat, gaming, screen sharing, etc.) between at least two endpoints. Additionally, the communication platform includes at least a second protocol. The second protocol can be used in application logic and control of the communication. The second protocol can be an asynchronous communication protocol that involves the messaging between the platform and an outside application server. The second protocol can be an application layer protocol such as HTTP, HTTPs, SPDY, and the like. The telephony application platform 110 can operate according to responses of an outside developer application. Messages sent over the second protocol preferably include communication state information. The state information can be embedded as query parameter, as message data, or in any suitable format. In some instances, the application platform 110 submits requests to the application server, and the application platform 110 will perform a service according to the response. Such a model can be common in communication-based service platforms where the service platform provides significant infrastructure to handle incoming calls. In this mode, the second protocol can be used in accessing procedural instructions generated and served by an external server. For example, in response to a call associated with an account, the telephony application platform 110 requests direction from an application server of the account. Similarly, the second protocol may be used in response to any event of the application platform 110. For example, the procedural instructions can be telephony instructions organized into a telephony instruction document. The instructions are preferably, at least partially, proceeded sequentially and translated into actions over a communication protocol (i.e., the first protocol). In another variation, an API request can be transmitted to the communication platform. The API request may be formed so as to augment and mutate communication state, which can translate into actions performed over the first protocol. For example, an application can use a REST API call to alter the state of a current voice session.

The application platform no acts as infrastructure delegate for a particular outside application. The application server can be hosted and operated by an outside party independent of the telephony platform. Considerable infrastructure and services are required to provide the calling services. Logistically, the complexity of a communication application platform no can be a barrier to allow customer access to raw metadata, logs, and/or analytics. In a first case, a given action by the application platform 110 will involve multiple resources and components of the application platform no. These resources and components can log information for internal diagnostics and tracking, but this raw data could expose the underlying infrastructure of the application platform 110, which could open up more widespread security issues. In a second case, the internal diagnostics and tracking can be useful for the application platform no, but a significant portion of the data could be completely irrelevant to outside developers or applications. Similarly, the communication application platform 110 will log information across multiple communication protocols and resources, and the interaction of the multiple protocols (facilitated by the application platform no) can be useful to an outside entity.

The application platform 110 will include a plurality of severs, service engines/modules, routers, processor engines, components and/or other suitable resources that are used during operating the platform. A subset of the platform resources can be publicly accessible. A public resource would be a platform resource explicitly or implicitly exposed to outside entities. Explicit exposure can include any resource directly addressable by an outside entity. An implicitly exposed resource can include resources that operate on the edge of the application platform no and interface with an outside entity. While an outside application may not be able to directly address communication to the implicitly exposed resource, the IP address or resource address may be visible when inspecting communication messages. A load balancer node is a common public resource that is visible by outside users. Another subset of the platform resources can be internal resources. Internal platform resources are used internally and preferably do not communicate/interact directly with outside components. While internal platform resources can be responsible for a processing or otherwise handling a task, the internal platform resource is preferably kept transparent to outside entities. The exposed platform resources and the internal platform resources preferably log events or otherwise contribute to metadata records.

The internal log storage system 120 of the preferred embodiment functions to store records of events and/or metadata of the application platform 110. The internal log storage system 120 can be any suitable metadata repository. The internal log storage system 120 stores the information for internal diagnostics and operations, but the system can additionally expose an augmented version of the data to outside entities. The internal log storage system 120 can be a single repository where all resources of the application platform 110 store metadata. More preferably, a plurality of different storage systems is used to store different types of data. The internal log storage system 120 can be database or data storage solution operated by the platform operator. Alternatively, the internal log storage system 120 can use an outside storage solution such as Amazon's S3 storage solution or any suitable storage service. In a first variation, a packet logging service is implemented within the components that handle SIP communication. Those components can run a service to store packet history (e.g., pcap "packet capture" files) in the internal log storage system 120. In a second variation, an application instruction document is processed on behalf of a user account (e.g., a developer using the platform for an outside application). As the instruction document is processed, various operations and events could be executed. Multiple services can contribute to processing the application instructions. In the telephony application platform 110 example, processing instructions could include a voice service, a SMS service, an MMS service, a SIP service, one or more media transcoding service, a text-to-speech service, and/or other suitable computing resources. The various resources of the platform can store metadata records into one or more internal log storage systems 120. In a third variation, the application platform 110 can provide a number of accessible API resources. A subset of the API resources can be used to invoke different actions and behavior by the platform. Calls made to the API resources that either query the API or mutate the API resource can be logged along with responses to API calls. Another subset of the API resources can be accessed to retrieve media and/or information about a particular item. For example, the telephony application platform no can include a call resource where information about a call such as origin phone number, destination phone number, and call duration can be accessed. Resource data generated or captured by the application platform 110 can be stored in an internal log storage system 120. The information can be stored in a raw form and sanitized on demand.

The log sanitizer 130 of the preferred embodiment functions to process and clean metadata of the internal log storage system 120 for outside consumption. The raw metadata and the information contained in the stored records can include several components that could be unsuitable for sharing with the users of a multitenant platform 110. Some exemplary metadata information that could be sensitive information can include IP addresses or other endpoint addresses of internal platform resources, internal signaling of internal platform resources, communication flow protocol between multiple platform resources, sensitive user information, proprietary data or information valuable to the platform, internal errors or warnings, partner information, and/or any suitable logged information that a platform operator (or user of the platform) would have reason to keep unexposed. The log sanitizer 130 preferably abstracts the log information to level where only desired information is exposed. In one variation, the amount and type of information sanitized can be dynamically set according to a policy engine. The policy engine preferably uses a request account to determine the level of sanitization.

The log sanitizer 130 can use a variety of different processes during the sanitization process. In a first process, internal resources are generalized to a parent or related public resource. During a communication session, a public resource will interface between an outside entity and the internal platform resources. As opposed to attributing the different events to the responsible internal platform resources, the logged events can be attributed to the public resource. From the perspective of the outside application, a single public resource is responsible for all the events. During packet logging, the IPs of internal platform resources are replaced with an IP of a public resource. The log sanitizer 130 can additionally recalculate any checksums or reprocess other aspects of the packet when updated with a sanitized IP address. The log sanitizer 130 can additionally filter events. All or select events of internal platform resources can be removed, condensed, or summarized to simplify the metadata provided to outside users. Similarly, some events may be reduced to simplified representations. For example, in a telephony application platform 110, it could be beneficial to show that different network carriers were contacted when initiating a new call. However, it could be detrimental to reveal the actual carriers used and any prioritization of those carriers. In this situation, the log sanitizer 130 can anonymize the carrier names and details (e.g., SIP addresses, IP addresses and the like). The log sanitizer 130 can additionally use log patterns across accounts, session instances, requests, or other instances of platform use. For example, the log sanitizer 130 can identify application instruction logic errors based on recurring patterns in multiple events. The system can additionally include a cache of sanitized metadata such that repeated requests do not require raw data to be re-sanitized a subsequent time. The log sanitizer 130 preferably includes interfaces to the internal log storage system 120 and to at least one outside interface. The interface can be to a web stack, which can use the data to provide a graphical user interface, or to an exposed API such that programmatic interaction with the information can occur.

In the first exemplary implementation, the SIP pcap information is sanitized, cleaned, organized, or otherwise augmented to remove references to internal platform resources and to generalize platform actions to the public platform resources. Additionally, some internal routing can be removed from the pcap information logs, which functions to abstract internal operations of the application platform 110 to those impacting outside applications. In the second exemplary implementation, processing of instructions is sanitized to anonymize or remove references to internal and protected outside resources (e.g., partner resources).

The exposed log interface 140 of the preferred embodiment functions to provide an access layer to sanitized log information. The exposed log interface 140 is used by outside account holders and/or applications to access or read metadata. The metadata is preferably stored in reference to historical use of the application platform no. The metadata can be grouped or associated with particular sessions of use. The exposed log interface 140 can enable an entity to access metadata of a particular account, accounts, sub-accounts or sub-accounts, and optionally to specify a particular sub-set of metadata to be accessed. In a first variation, the exposed log interface 140 is a graphical user interface. A web stack or native application uses a private or non-public API to communicate with the log sanitizer 130 to request a particular set of logged metadata. The log sanitizer 130 can sanitize the requested data on-demand and then transmit the information to the web stack or native application. The web stack or native application can then transform the sanitized metadata into a graphical user interface. In another variation, an API can be exposed by the application platform 110 such that the information can be programmatically retrieved. The API is preferably a REST API, but any suitable type of API can alternatively be used.

The log interface 140 in one variation includes a set of graphical user interface component, which function to facilitate understanding and utility of log information when viewed by a user.

As a first component, a graphical log interface 140 can include a browsing interface, which functions to provide a mechanism through which a user can explore log information available to an account. In one variation, the log information is a time ordered list of event logs. More preferably, the log information is partitioned or segmented into different portions that represent different sessions as shown in FIG. 4. For example, all event logs associated with a particular communication session can be grouped together. In one case, multiple communication sessions are executed in parallel, and each of the sessions can be segmented into individual information sequence logs so that the sequence of events can be more easily followed. The browsing interface can additionally include a classification of log information segments. In particular, sequences with errors are classified and highlighted for inspection. The type of error and different error patterns can be classified. The user can explore different error classifications to see a collection of log information sessions that include or relate to the error. In one variation, errors of higher priority or that have been classified as solvable may highlighted above other errors. Additionally or alternatively, the browsing interface can include a search tool. The log information is preferably indexed based on the properties used in the communication. The indexed log information can be searched using any suitable search interface. In one example, a user can search for log information be defining a search query based on packet parameters.

As a second component, the log information is formatted into a unified event log interface as shown in FIGS. 4, 8A, 8B, 9A, and 9B. The unified event log interface preferably includes a sequenced combination of at least two protocols. As described, a first protocol may be a SIP protocol and the second protocol may be an HTTP-based protocol (HTTP or HTTPS). The unified event log interface is a combination of at least two forms log information with the sequence set based on timing and/or cause and effect. For example, the unified event log interface may show an API request to initiate a call, the SIP communication in negotiating the call, the HTTP communication between the application platform 110 and an outside server when obtaining procedural instructions, and then the resulting updates to the SIP communication.

The unified event log interface can additionally include error or event annotations. The annotations can be used to add descriptive markers for portions of the event logs. A set of individual log records may be summarized as performing some actions. For example, the SIP sequence of communications related to calling a number may have an annotation of "calling phone number". Errors may additionally include annotations that add a description of the error. In one variation, the error annotation can include a suggestion for a solution.

As another component, the log interface 140 can include shared log browsing mode, wherein two graphical log interfaces are synchronized between two device instances. The shared log browsing mode is preferably used as a tool for customer support agents aiding a customer. The shared browsing mode can include a first account view of log information and a second account view of log information. Preferably, one account can have greater permissions or access to log information, while a second account has a restricted view of the log information (i.e., the log information is more heavily sanitized). In one use case scenario, a customer can call customer support, and the log information viewed by the customer can be synchronized with the customer support. However, the customer sees a sanitized view of the log information while the customer support views log information from the same session but with the log information sanitized in a different format or with no sanitization at all. In one variation, actions made through one device instance can be synchronized by a second instance.

As another component, the log interface 140 can include an event replay tool, which functions to enable one or more event sequences to be replayed. The event replay tool can enable different requests originating from the application platform 110 to be executed. The outbound message is preferably transmitted to the same destination in substantially the same manner. Some parameters may be edited or changed during replay. The replayed communication can result in a response. The response may be compared to the original response with differences highlighted for easy comparison. In one variation, each step in a sequence of communications has to be individually initiated. In another variation, a user can individually step through a sequence. Alternatively, a sequence of communications can be replayed at any suitable time.

2. Method for Providing Sanitized Platform Metadata

Figure 5:
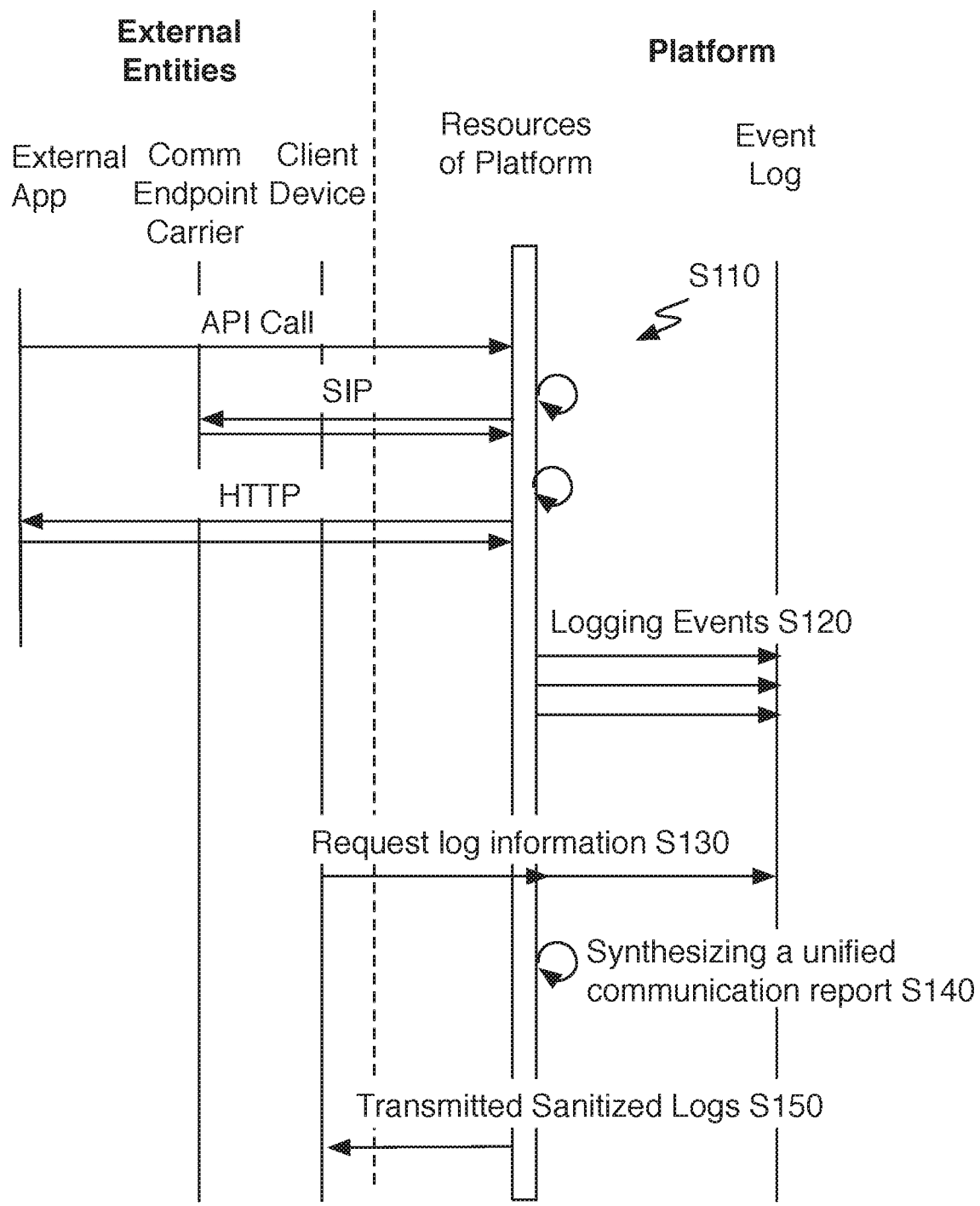
FIG. 5 is a communication flow diagram of a method of a preferred embodiment.

As shown in FIG. 5, a method for providing sanitized platform metadata of a preferred embodiment can include executing an application platform utilizing a set of protocols Silo, capturing internal log information during execution of the application platform S120, receiving a request to access log information by an outside entity S130, synthesizing the internal log information of the set of protocols into a unified communication report S140, and transmitting the unified communication report S150. The method functions to expose a useful interpretation of account logs in a communication application platform that has been delegated communication responsibility by an outside party. Preferably, the unified communication report is used in creating a unified log visualization that makes sense of communication signaling of a first protocol and the related log events of application logic of a second protocol. In one variation, the first protocol is a media signaling protocol such as SIP and the second protocol is an application layer protocol and more specifically an HTTP based protocol employed in obtaining application directives.

Figure 6:
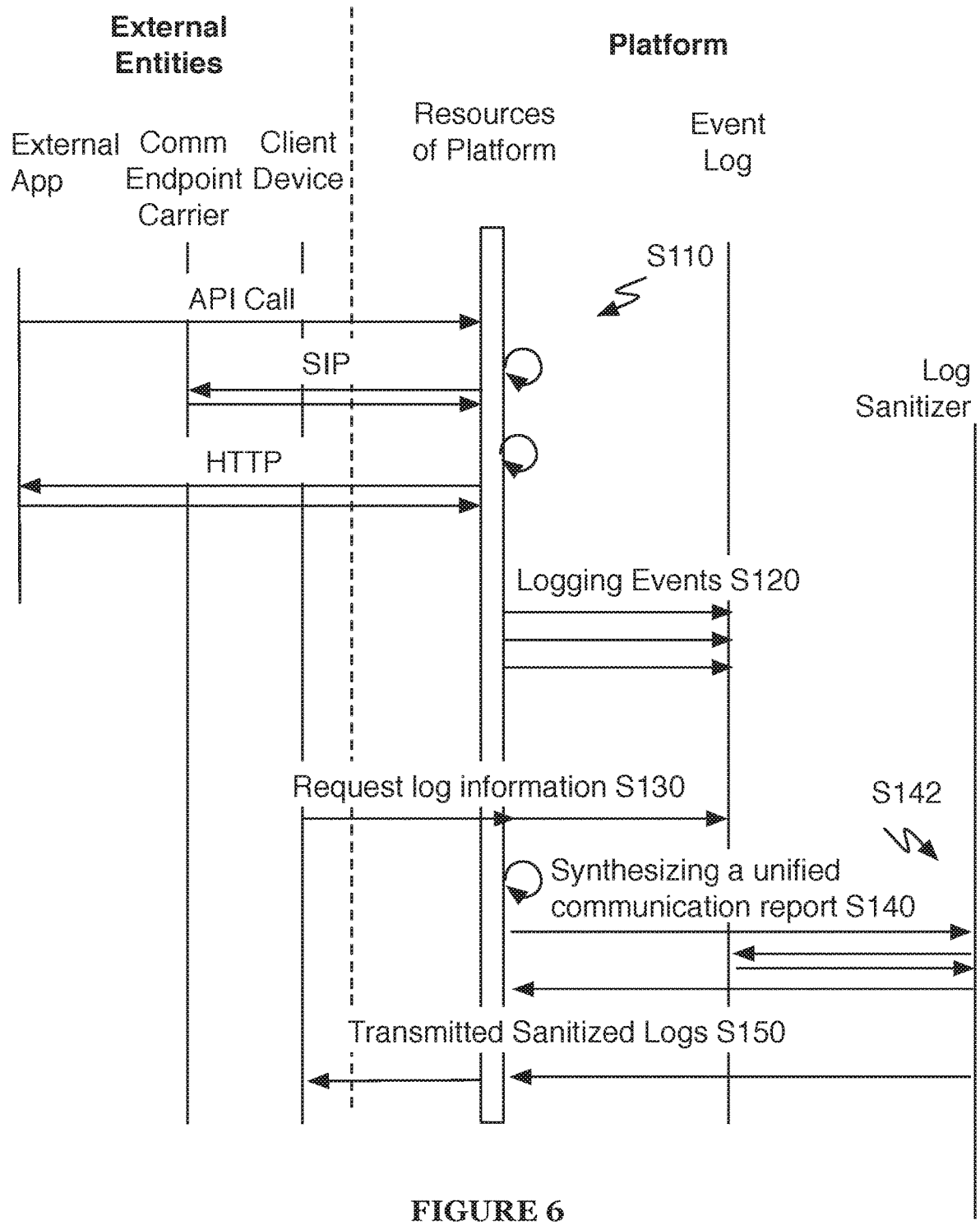
FIG. 6 is a communication flow diagram of a variation of a preferred embodiment.

In one variation, synthesizing the internal log information can include sanitizing the log information S142 as shown in FIG. 6, wherein the method can function to share internal log information of an application platform while preserving confidential or internal information of the platform. An application platform can generate considerable log and eventing records to support execution of the platform, platform analytics, and issue resolution. The method enables the information to be reformatted and selectively formatted to provide relevant data and uncompromising data. A first potential benefit of the method is the automatic privatization of internal information of full event information. A second potential benefit of the method is the automatic simplification of log information. If all internally logged information were exposed, the data could be rendered unusable by outside entities because of the large barrier to interpreting and processing the information into a usable form. The method can simplify, reduce, and interpret log records into a more consumable format for outside entities.

The method can have particular benefits for session logs or a set of interconnected or related records. For example, the method can be applied to packet-based record synthesis and sanitation such as the data generated during a SIP communication session or other synchronous communication session. The method can similarly be used in platforms with instruction interpretation where a sequence of processes is initiated in response to interpretation and execution of an instruction document (e.g., an XML document of telephony instructions). The logged information can be exposed over a user graphical interface or alternatively through an API of the application platform. In particular, the method has benefits in the area of telephony or communication application platforms, where the application platform includes extensive infrastructure to support the service provided to outside customers (e.g., developers and their respective applications). An outside developer may delegate complicated communication processes of his application to the communication application platform, and because many of the processes involve internal infrastructure, the method can facilitate exposing at least some of the internal logs in a safe and controlled manner.

Block Silo, which includes executing an application platform utilizing a set of protocols, functions to run, host, or manage an application platform. The application platform is preferably a platform-as-a-service (PaaS) type infrastructure that provides processing, resources, or services to outside entities. The outside entities are preferably account holders but could alternatively be any suitable outside entity. Developers and managers of applications configure their respective applications to use the application platform to facilitate at least a portion of the application offering. The application platform is preferably a multitenant platform, servicing multiple accounts on shared resources. The application platform can additionally enable forming hierarchical multitenancy such that accounts of the application platform can similarly have subaccounts wherein the parent account seemingly provides multitenancy. A subaccount or a basic account may both be suitable outside entities. The logged information of the method is preferably logged for multiple accounts if not all accounts, but the method can similarly be applied to non-multitenant platforms or to individual accounts.

When executing an application platform on behalf of an outside entity, executing the application platform can include several different types of operations. These operations can be dependent on the objective and function of the particular application platform. One preferred type of application platform is a telephony or communication application platform as described and referenced above. Various use-cases of the method for a communication platform are used herein. However, the method is not limited to such use cases and can be applied to any suitable platform.

In one exemplary mode, executing an application platform can include routing a communication session through at least two resources of the application platform. When an application platform is facilitating communication with one endpoint or between two or more endpoints, the application platform can depend on multiple resources to provide a service. This may involve routing between two resources that each connects to a different endpoint. For example, a caller in a first region may connect to a local resource in the first region. The application platform then routes communication through different resources to a resource in a second region to connect to a call destination endpoint. In another example, an outside entity connects to a public resource of the platform, and then one or more internal resources actually processes the requested task before public resource responds to the outside entity. Such communication routing, negotiating, and orchestration can be at least partially achieved through a media signaling protocol. The media signaling protocol is preferably SIP but may alternatively be any suitable protocol. Log information related to the SIP packet traffic that passes within the platform and on the edge of the network (inbound and outbound Sip traffic) may be logged events. For example, logged information of the SIP traffic may show the INVITE request of a caller, the trying response to the caller, an INVITE to a first destination, the Ringing messages, the acceptance message, the acknowledgement message, and the session progress message, and a BYE message. The logged information can include any suitable SIP message. A communication signaling protocol of the application platform preferably bridges and coordinates media flow between at least two endpoints.

In a related mode, executing an application platform can additionally include processing application logic of a communication session, which functions to perform delegated business logic of an outside entity. Processing application logic can include obtaining, interpreting, and executing instructions. In one variation, an application layer protocol is used in retrieving or receiving application instructions. The application layer protocol is preferably an HTTP-based protocol such as HTTP or HTTPS, but may alternatively be any suitable application layer protocol such as SPDY. In one variation, an event callback URI is configured for an application or an account. The application platform makes a request to the event callback URI using the application layer protocol upon detection of the event. A response to the request preferably includes procedural instructions. The procedural instructions can be telephony instructions that may direct a communication-focused application platform to call a number, message a number (e.g., SMS, MMS), make a video call, start a recording, collect input (e.g., DTMF), play audio generated from text (e.g., text-to-speech), play an audio file, put the communication session in a queue, join a conference, redirect the call, hang-up, or any suitable action. The telephony instruction retrieval can preferably occur upon initiating or redirecting communication session control as in the system described in U.S. Pat. No. 8,306,021 filed 6 Nov. 2012, which is hereby incorporated in its entirety by this reference. The procedural instructions are preferably contained within a document and more preferably formatted in a markup language document. The procedural instructions are preferably at least partially processed sequentially. The procedural instruction documents are preferably retrieved synchronous to the transactions of a communication session. For example, a call may be received resulting in SIP events; the application platform then retrieves procedural instructions using HTTP; processing the logs results in inviting another endpoint over SIP; and the next instruction then redirects application control to another URI in response to some user input (e.g., a DTMF key). The retrieval of procedural instruction documents can have an at least partially synchronous order with the SIP events.

The processing of application logic can additionally include the processing of application programming interface communication directives. API requests of outside entities may additionally or alternatively be used in affecting the business logic of a communication session. The API requests are preferably received asynchronous to other events. In other words, an API call may be received which causes a call to be ended in the middle of its session. The API is preferably a RESTful API but may alternatively be any suitable API such as SOAP or custom protocol. The RESTful API works according to an application layer request and response model. An application layer request and response model may use HTTP, HTTPS SPDY, or any suitable application layer protocol. Herein HTTP-based protocol is described, but it should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, Put, POST and/or DELETE. Accessing of these resources can be logged and any mutation of the resource can similarly be logged. In some cases, mutating an API resource can alter the processing of one or more communication session. Additionally application layer protocol communication may additionally be used internally in directing media handling.

Processing application instructions can similarly involve multiple internal computing resources. It can be desirable to keep the architecture of the internal resources secret or unexposed. The internal resource addresses, the communication and networking protocols, the number of resource instances, the location and distribution of resources, the software or hardware of the resources, errors or warnings of internal resources, and/or other aspects can all be considered confidential or private. An operator of an application platform can want to keep the information private for privacy issues, security issues, operational advantage issues, or for any suitable reason. In one variation, the application instructions are executed sequentially, and the various involved resources log events and communications as individual instructions are executed. Internally this creates a raw log of actions and reactions when executing the application instructions. This can be useful for debugging, optimizing, or otherwise reviewing execution of a set of instructions. The method can provide a sanitized version of such debugging information while preserving sensitive information. Additionally, the application instructions may be reused in part or whole in additional application instances (e.g., executing the application for different users). The method can be used to interpret and understand events across multiple instances of application instructions.

In other various types of application platforms, executing an application platform can include transforming media, hosting resources or services, or any suitable operation. The different resources involved in a communication session (e.g., those involved in the communication signaling and application logic related communication) can contribute to log information in block S120.

Block S120, which includes capturing internal log information during execution of the application platform, functions to record events, packet records, resource configuration, API resource metadata, and other raw internal operational information of the application platform. Capturing log information can include a resource communicating log information and storing the log information in a log storage system. During execution of the application platform in Block Silo, the various services and resources can log individual operational information. For example, a resource can submit a log for each request received from another resource and/or response transmitted from the resource. When executing a communication session, involved resources can record signaling packets used to direct and control the media stream of the communication session. For example, during a SIP-based communication session, a public node (e.g., a load balancer) can capture all packets from the network and sort each call into a pcap record. The pcap records are then stored in a hosted storage system (e.g., Amazon S3). The network packet records can be stored in any suitable format. When interpreting and executing instructions, resources perform actions on behalf of a request or communication session. The resources can record their actions, status, and other suitable metadata when facilitating execution of the instruction. The metadata is preferably logged in association with a responsible request identifier. In one variation, the request identifier can be a communication or call identifier. In another variation, the request identifier can be a timestamp and account identifier. The request identifier can be used to link or associate a sequence or set of log information.

Block S130, which includes receiving a request to access log information by an outside entity, functions to have an outside party use an established mechanism to access a form of the log information. The outside entity is preferably an account or sub-account holder. The request can be issued programmatically by an outside application using a provided set of API calls. The request can alternatively be initiated due to interaction of an account holder or administrator. In one variation, a graphical user interface is provided that an account holder can use to access and review log information. A web stack that manages interfacing with browser clients can be configured to use an API (e.g., private or public API) to contact a log processing service to provide access to a unified public version of the log information. In an alternative implementation, an outside application or service can programmatically request log information. A RESTful API can be used to access unified and optionally sanitized log information, but the API may alternatively be any suitable API such as SOAP. A request to access log information may be a query for a particular type of log information. Alternatively, the request may be a default request wherein the most recent log information or some predefined type of log information is requested.

Block S140, which includes synthesizing the internal log information of the set of protocols into a unified communication report, functions to process the raw log information into a version to expose externally. The unified communication report preferably synthesizes the internal log information of a first protocol and at least a second protocol. The first and second protocol can be substantially independent protocols by design. However, the application platform directs use of at least two protocols in an inter-connected manner, wherein cause and effect of errors or transactions can be traced between the two protocols. In a preferred implementation, the two protocols can be SIP for media signaling and HTTP-based protocol for application logic control. The method can similarly be applied to an application platform that uses more than two protocols. For example, the unified communication report may collect the inter-related communication logs for three or more protocols. For example, a call from a SIP phone bridged to a proprietary voice over IP protocol and controlled by instructions retrieved from an application server may have events from three different protocols reflected in the unified communication report.

Synthesizing the internal log information into a unified communication report can include collating log information across a collection of log information, which functions to collect and organize the log information. The collection is preferably log information of at least two platform used protocols. The collection also defines a set of log information, which can be interpreted as a block. Preferably, a collection is the set of log information related to a single communication session. For example, the SIP packets and HTTP requests/responses issued for a single phone call would be included in the collection. Forming a selection can include partitioning log information according to collection definition. In the communication session example, a call session identifier property may be used to identify all log information with the same call session identifier. A collection could alternatively be all communication sessions involving a particular endpoint, all log information for a sub-account, all log information for a particular day, or any suitable collection. In partitioning log information, the time stamp of a log record may be ignored such that log records in sequential order may not be part of the same collection. For example, two communication sessions may generate log records with overlapping and intermingled events, but partitioning functions to split the log records into two collections. The type of collection may additionally change depending on the request or requirements. For example, a log reporting interface may allow a customer to screen individual communication sessions for different types of errors in a given session, but the log reporting interface may additionally screen log information for warnings about repeated calls which may use collections of events for a given caller, which may allow an administrator to observe how customers perform repeated communications.

Synthesizing the internal log information into a unified communication report can additionally include sequencing can include assigning event dependence order, which functions to order the log events. The log events are preferably organized to reflect causality of events. In one variation, ordering the log events within a collection by time will achieve a sequenced order. However, in some instances, the exact time order may not be of as much significance as the causality order. If a first SIP message is received which results in an HTTP request, those two messages are preferably represented in the unified communication report as sequentially ordered. In this example, even if an API event was triggered in between the SIP and HTTP request, the time order of these three events may be broken, placing the API event. Different ordering rules may be made. Similarly, events may be removed or curated to show the most meaningful events. Additionally, the log information may be sanitized as in block S142.

Figure 7:
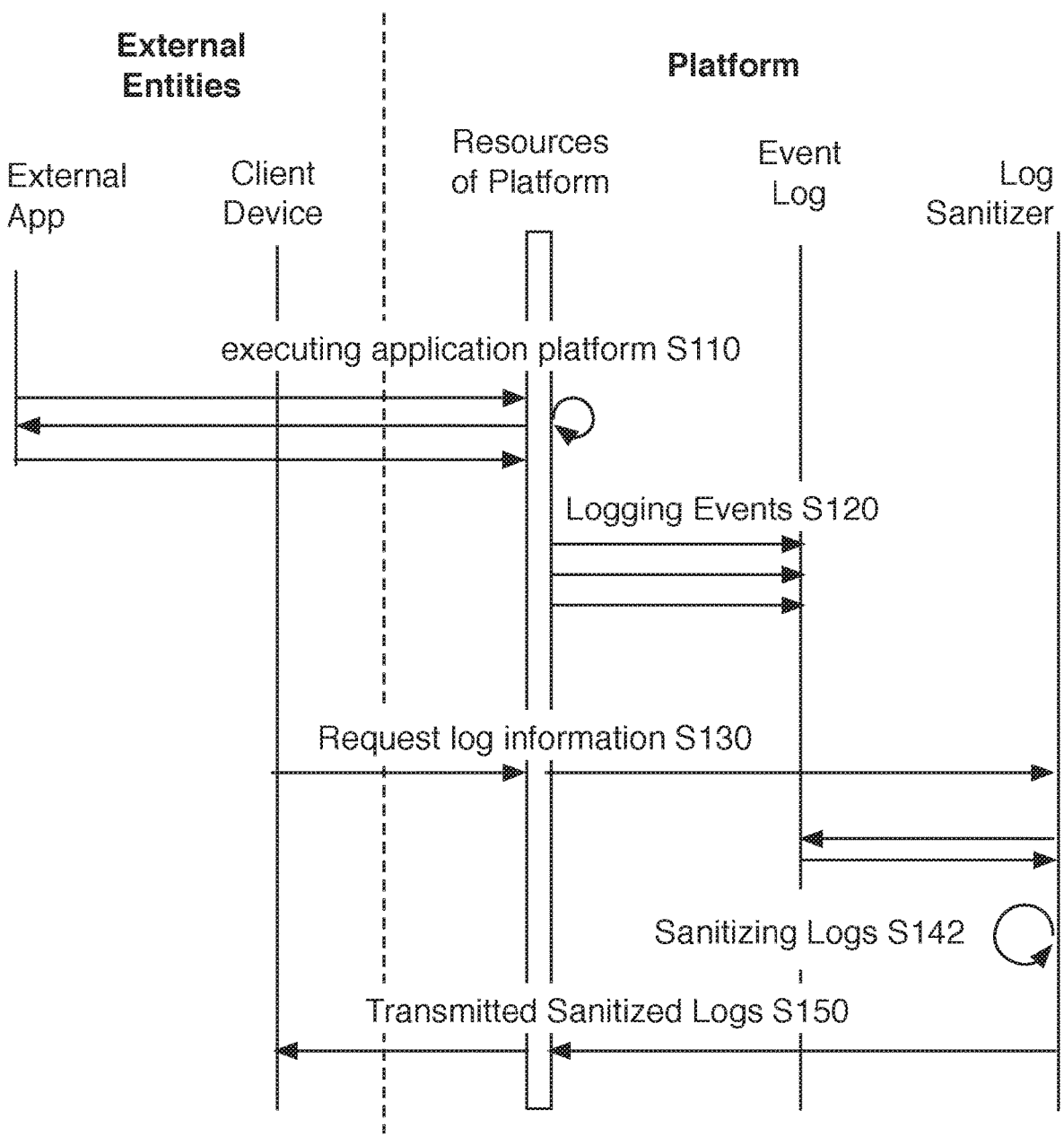
FIG. 7 is a communication flow diagram of a method of an alternative preferred embodiment.

Additionally or alternatively, the method can include Block S142, which includes sanitizing the log information, functions to store log information for consumption by outside parties. The log information is manipulated, processed, and otherwise altered to remove private information, simplify or abstract internal processes, and selectively filter information. Sanitizing log information is preferably performed at a sanitizing service. The sanitization of log information is preferably responsive to outside requests such that information is sanitized on demand. The log information can alternatively be sanitized preemptively wherein the collected log information is sanitized during ingestion. In one alternative embodiment, the sanitization may be employed independent of collating and sequencing log events of multiple protocols as shown in FIG. 7. The sanitization may be applied to log information of any type. Sanitized information can additionally be cached for repeated requests. Access to log information can additionally be predicted through a suitable learning algorithm or pattern detection, and the predicted log information can be sanitized based on historical patterns. For example, an account that routinely accesses daily log information of a particular type can be pre-processed.

Sanitizing log information can include various processes to augment raw internal log information for outside consumption. In one process, sanitizing log information can include generating artificial log records with altered metadata. In one variation, resource identifiers are replaced with fake resources, public resources, or other suitable replacement identifiers, which functions to anonymize resources. Generating artificial log records can be applied to internal resources, outside partner resources, and/or participants of the logged event. Generating artificial log records may be achieved by abstracting communication of multiple internal resources of the platform to a single proxy resource. The proxy resource is a stand-in or placeholder representation that hides complexity of events that occur internal to that proxy resource. The proxy resource may be real resource or a generated representation of a resource. In one implementation, public resources can be used as stand-ins for internal resources, which functions to turn the application platform to a logged black box where events and information is attributed to one or more public resources. This can function to create an artificial simplification of what resource of the application platform is performing an action. From the perspective of an outside application, the application will connect with a first public resource (i.e., the proxy resource) of the platform, and all the associated events and metadata related to that connection are attributed to the public resource. In the original log information, the original raw logs would indicate the underlying internal resources that performed the various actions. When a set of log information is related through an identifier (e.g., a communication session identifier), externally exposed resources (i.e., resources communicating outside of the application platform) are used in place of internal resources. For example, the IP address of a public node can be used for internal resources facilitating a route. In pcap based sanitation, this can additionally include recalculating checksums of packets such that the sanitized packets appear legitimate. Similarly, partner resources can be anonymized. For example, a communication platform may use outside resources such as a set of different network carriers. Instead of exposing the set of network carriers and possibly their respective private address information, the method can include using generic or fake identifiers for sensitive information.

Other aspects can similarly be transformed to protect internal operation and data. For example, if log information because of its structure reveals a service, protocol, or other tool used, the records can be reformatted to a generic format or syntax to anonymize internal practices. In some cases, instead of replacing information with dummy information, sensitive log information can be generalized, categorized, or otherwise represented in an alternative form, which provides informational insight. For example, a particular piece of metadata could include detailed location information, user-identifiable metadata, or any specific information. The sanitizer can categorize exact information to a broader description. The location information can be transformed to regionally specific information (e.g., city information instead of latitude and longitude), and user information can be generalized into a generic descriptor of the user.

Sanitizing log information can additionally or alternatively include condensing log information, which functions to simplify logged information. Multiple records can be condensed or simplified into a single event record when returned to an outside entity. In some instances, considerably more log information may be kept by a platform than would be of interest to outside entities. For example, when a service is establishing communication through some communication channel, an outside entity may only be interested in the attempt to communicate and the result of that attempt (e.g., success, redirection, failure, etc.), while internal logs include requests, acknowledgements, handshaking, and other portions of the event. By abstracting the log information into a high-level summary, the public version of the log information can be more consumable by outside entities. Condensing log information can additionally function as a form of event folding showing different abstraction layers of information. Additionally condensing log information can include processing log information across multiple instances of an application, session, or other usage instance. Patterns across multiple instances can be modeled and interpreted into a simplified representation. For example, some errors may be evident when viewed across multiple communication sessions on a communication platform. Multiple communication sessions can be processed to identify the error.

In one variation, the level of sanitization is determined by a policy engine. Policy can preferably be set based on the requesting account. For example, an account with platform administrator privileges (such as a customer support agent) may be able to control the level of sanitization occurring on the log information. For example, a customer support agent may be able to toggle between a raw log information view of a unified communication report and a sanitized and simplified version viewed by a customer. A customer account may view a sanitized unified communication report. A sub-account of the customer may have access to a view even further simplified and sanitized. For example, a resource of the customer account may be sanitized in the report viewed by the sub-account.

Figure 8A:
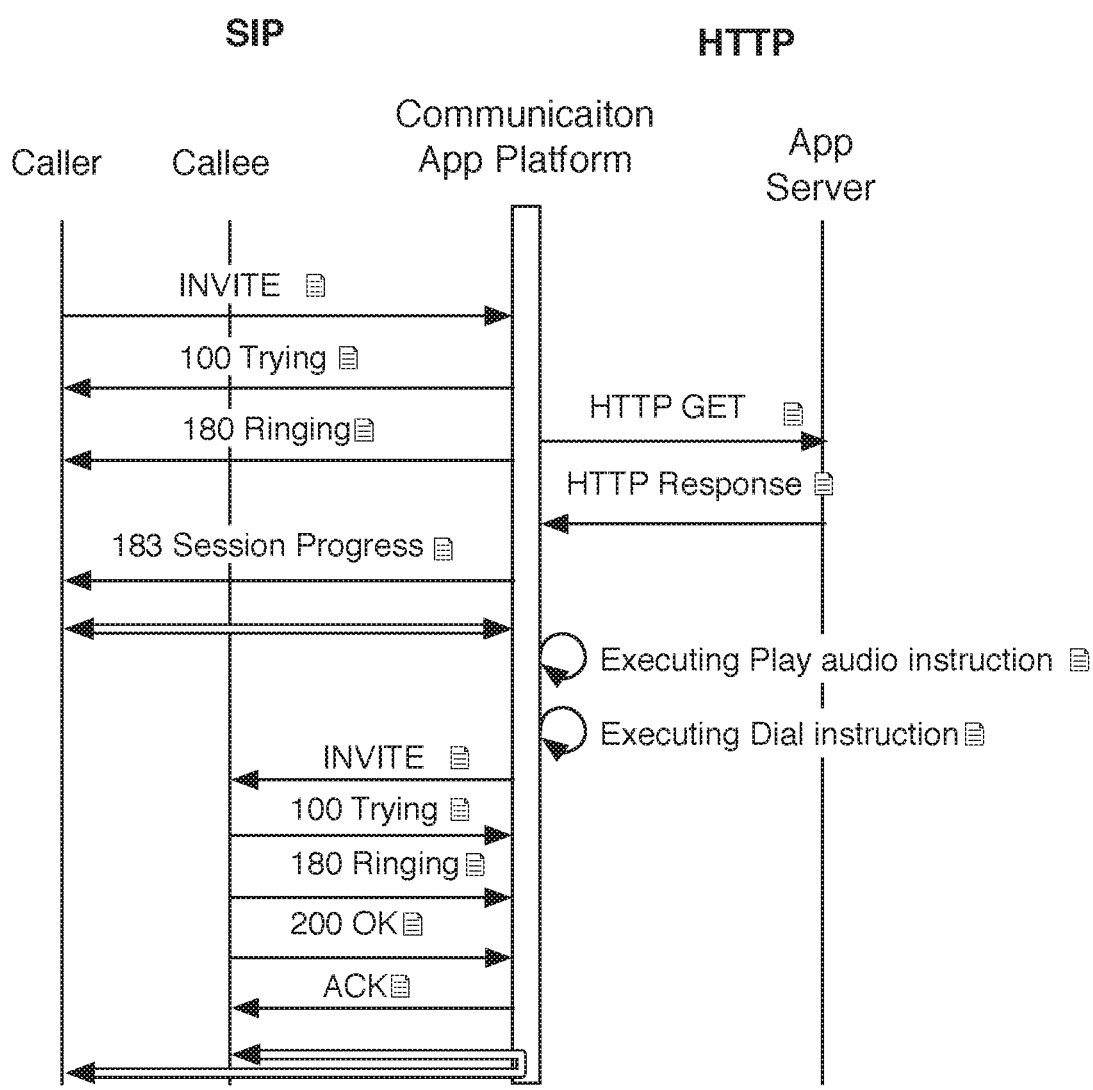
FIGS. 8A and 8B is an exemplary representation of a unified log report interface.
Figure 8B:
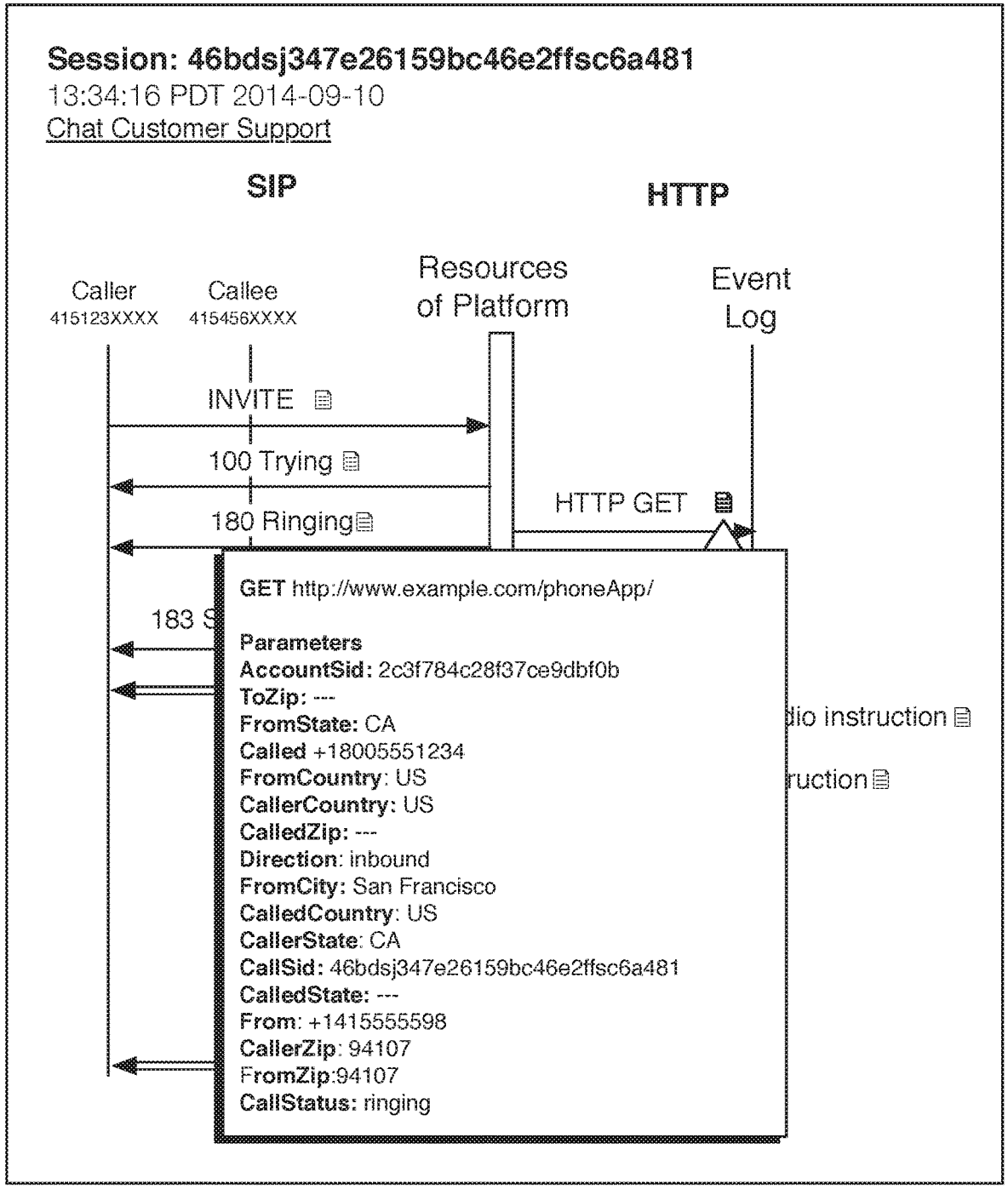
Figure 9B:
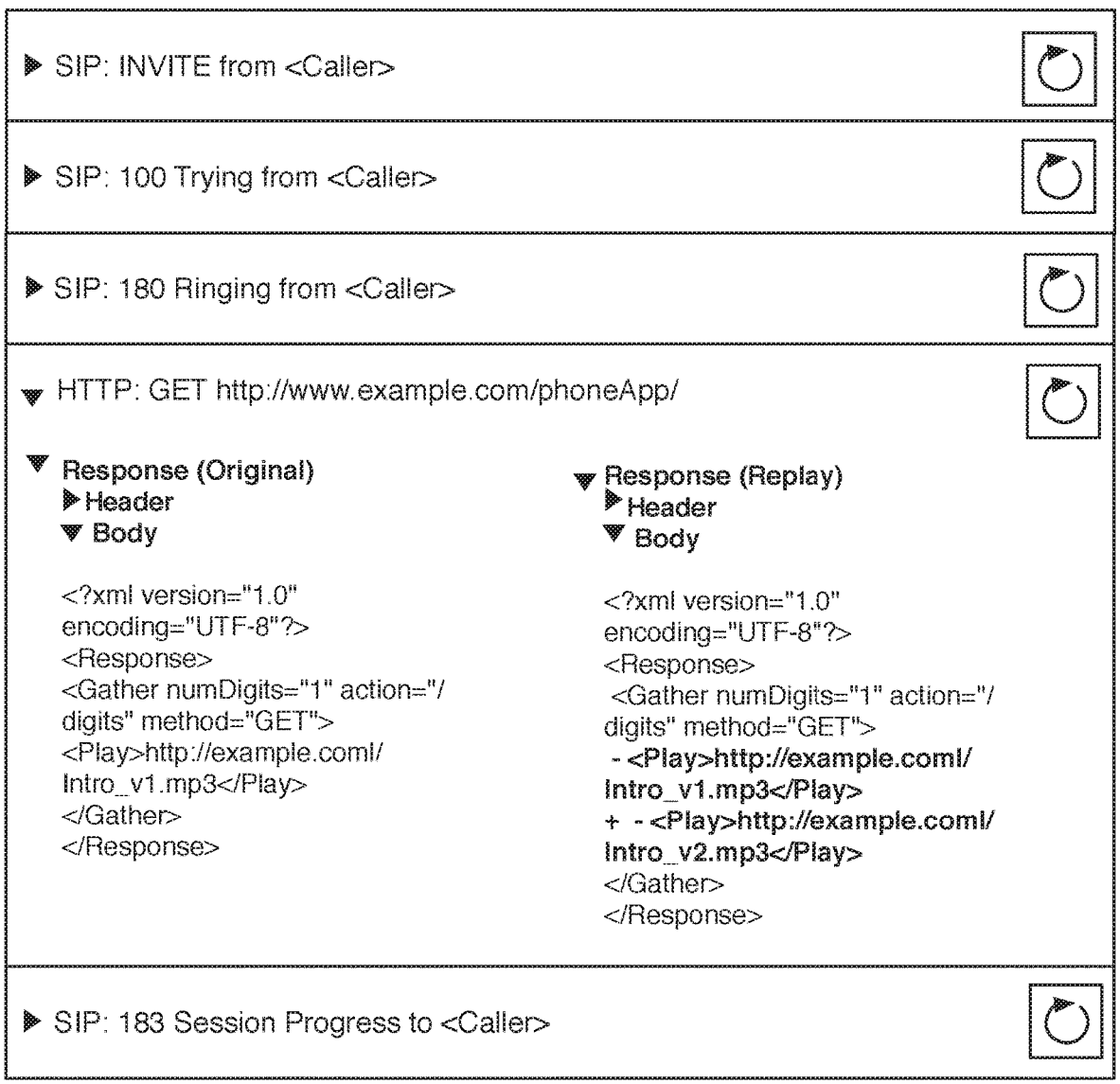

Block S150, which includes transmitting the unified log report, functions to respond to a request with log information augmented for outside use. The unified log report can be transmitted as a reply to the request. The transmitted log report may alternatively be delivered or made accessible in an alternative endpoint. For example, a request may prompt the generation of the log report, but the log report may be made accessible in a second location after the log information is sanitized. As described elsewhere, the sanitized log information can be pre-processed and automatically organized into info graphics or pre-organized data, but the log information may alternatively be returned in a data serialization format for handling and processing by the outside entity. In one variation, the unified log report is returned in a programmatic format such as in response to an API call or application instruction. In another variation, the log report is communicated to a destination endpoint. For example, the log report may be automatically delivered to a service health email address, which can be configured by the account manager. The unified log report may be embedded in the communication. Alternatively, a URL may be included to the related log report or reports. In a third variation, the unified log report is converted into rendered user interface element. The unified log report interface element may be static, but the report interface is more preferably interactive. In one variation, the unified log report is a communication sequence diagram representing the sequential transfer of information and actions between different resources as shown in FIGS. 8A and 8B. As shown in FIG. 8B, the details of different logged records can preferably be inspected. In another variation, the unified log report can be a listed transcription of event records as shown in FIGS. 9A and 9B. As described below, the report interface may include replaying the events, sharing the report with a customer-service agent, finding similar log report occurrences, exploring error resolutions, debugging applications, or any suitable use.

Figure 10:
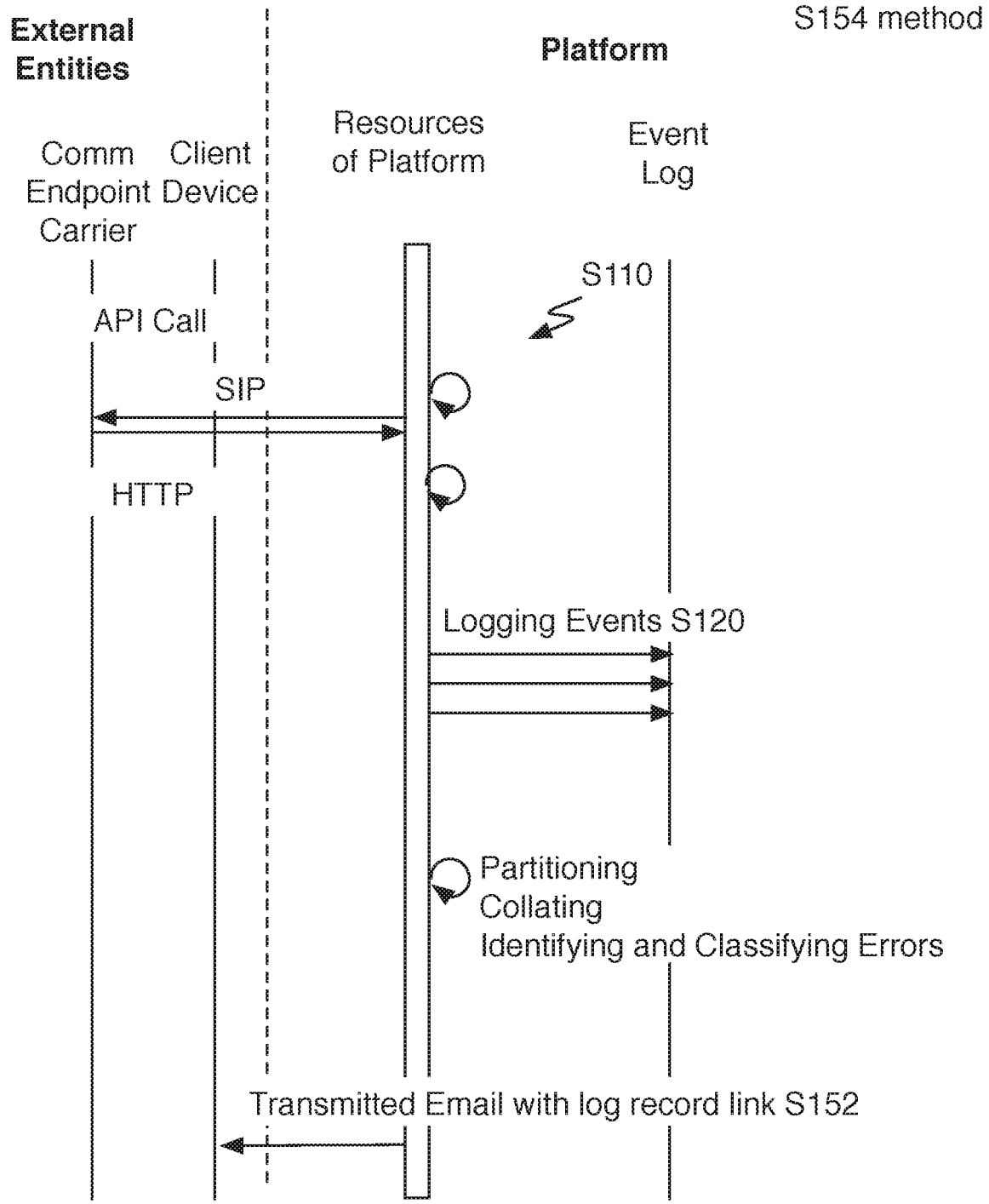
FIG. 10 is a communication flow diagram of a variation of transmitting a communication.
Figure 11:
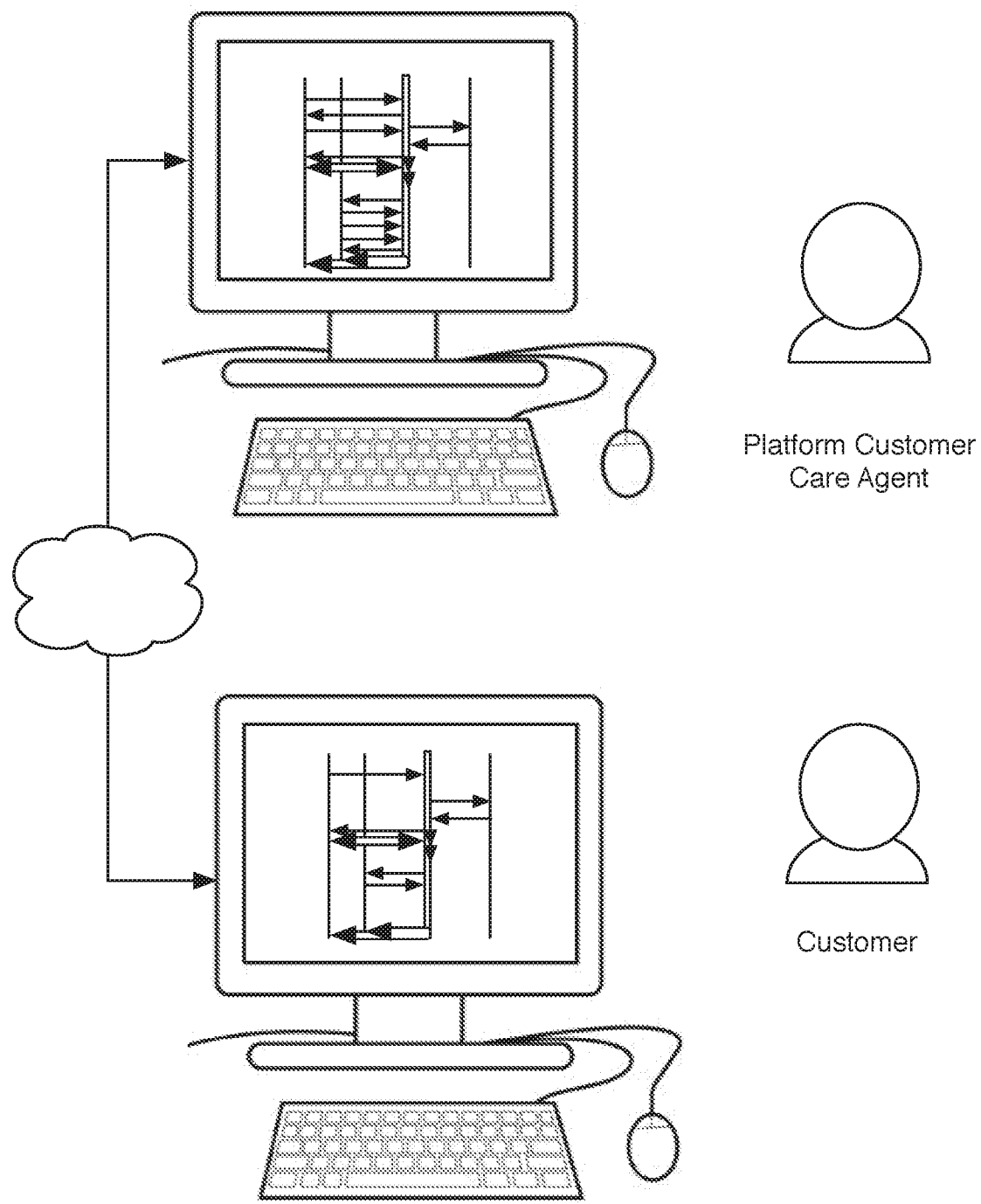
FIG. 11 is a schematic representation of synchronizing two log report interfaces.

The method can additionally include transmitting a communication to a configured destination S152, which functions to notify an interested party of events. Transmitting a communication can include sending an email, sending an HTTP message with log data to a callback URI, sending a text notification, or sending a communication to any suitable type of endpoint. In one variation, a log report summary may be sent in the communication on a periodic basis (e.g., hourly, daily, weekly, etc.). In another variation, the communication can be responsive to an event, and the communication can include one or more specific log reports as shown in FIG. 10. For example, a log report associated with an error can be sent when the error is encountered. Transmitting a communication can include embedding a link to a unified communication report. The communication may alternatively include a data representation of the unified communication report.

Preferably, a log report interface will include navigation tools to find, explore, and access log reports of different collections. In one implementation, the log report interface will include a time ordered list of relevant log reports. In one variation, the log reports may be filtered based on different characteristics as shown in FIG. 4. There could be an "all" category showing log reports for all calls. There could be an "error" category or categories for different error types such as "application timeout", "communication error" or any suitable type of error. There could be a warning category for log information that didn't encounter an error but have been flagged. For example, communications that had low media quality, short duration (e.g., <1 second), long duration (e.g., longer than an hour), slow application server responses, long duration of silence, and other occurrences, which warrant being notified of.

In one variation, the log report interface includes a searching tool. Accordingly, the method can include indexing properties of the log information S160, which functions to allow search queries to be made using various properties of the individual log records. Once indexed, a request to access log information may provide different search query parameters that define the results of the query. The search is preferably completed using the indexed log information and then the results are returned in a suitable format. For example, a user can use the log report interface to search for all log reports that included an instruction to play the mp3 file test.mp3. Events that satisfy this query can be identified and then the appropriate log reports formed. In the user interface, the search results may prevent a summary description of the log such as the time and associated endpoints. The search results may additionally show a preview of the log report.

In one particular use case, the log report interface is used in conveying errors encountered by the system. Accordingly, the method can include detecting an error and classifying the error in a unified communication report. In one variation, the error is an event that is logged during execution of the application platform. Error classification may be based on error codes. Additionally, error classification may process the actual events in a collection and generate a summary of the error. For example, an error may be encountered at one point in a sequence of events, but there may be a subset of events that may be involved in resulting in the error. The log report interface may highlight the involved events in the unified log report as an annotation. The event classification can similarly be used in making the log reports more navigable. For example, the method may classify errors based on which ones are solvable. Solvable errors may be of interest to an account holder because they may be easily avoided. Unified log report classification can additionally allow similar collections to be grouped. In one variation, event sequences within individual log reports are analyzed and related to log reports with substantially similar sequence patterns. These event sequence patterns may be predefined. For example, conference call event patterns, phone tree event pattern, and other common event log patterns may be predefined so that these categories can be easily accessed by a customer. Alternatively, the event sequence patterns are automatically processed. Any suitable approach to event sequence pattern comparison may be used. As one simple approach, similar log reports may be identified by identifying other log reports where the communication session is controlled by the same application server URI. Identifying similar log reports can be used to show similar log reports for a given log report, which functions to provide a simple interface for a customer account to compare the differences between different scenarios.

Figure 12:
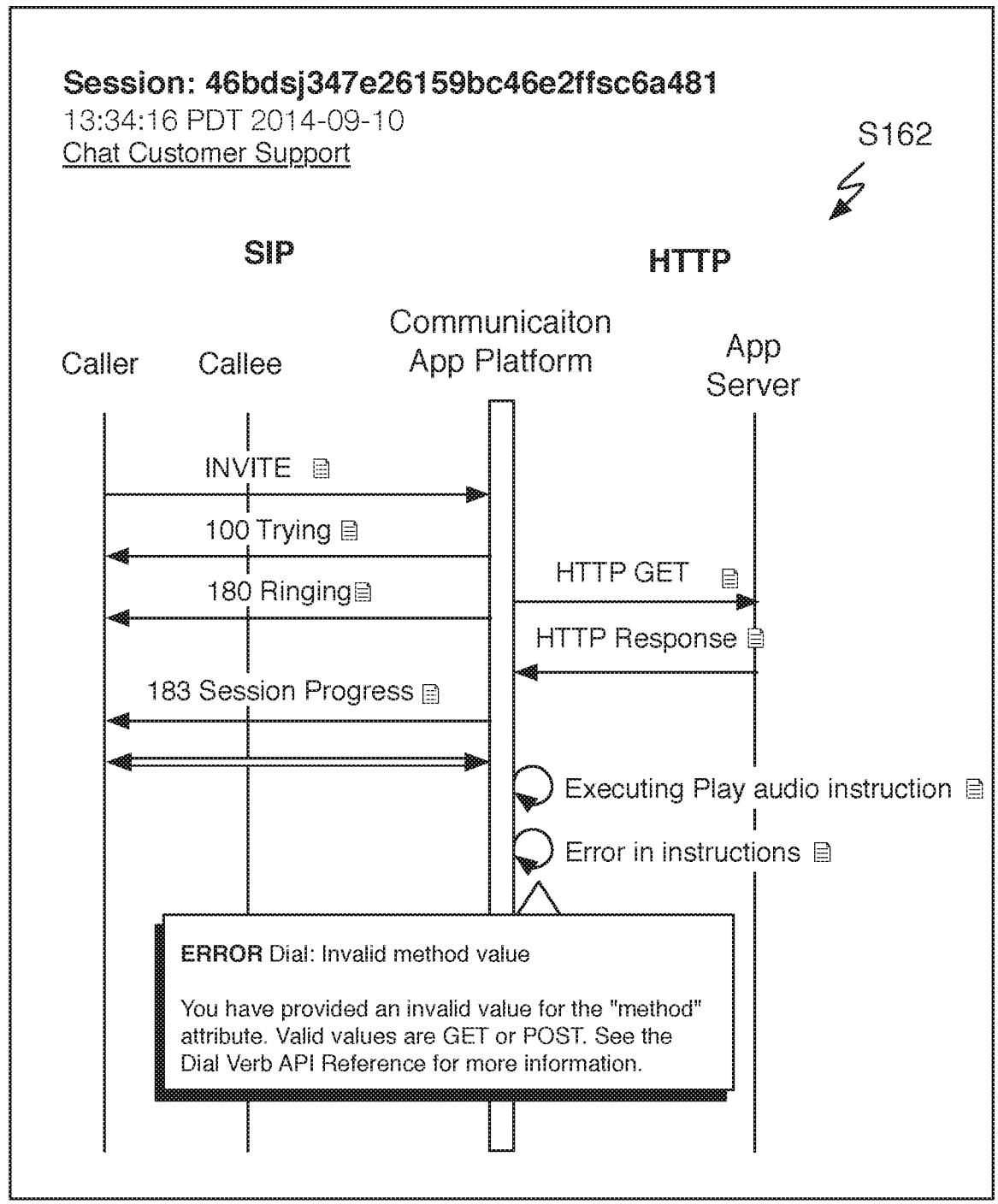
FIG. 12 is a schematic representation of annotating a log report.

The method can additionally include annotating a unified log report S162 as shown in FIG. 12. The annotations can be informational markup, which can be conveyed in an API response. However, the annotations are more preferably rendered user interface elements that identify and optionally provide information relating to the annotated item. For example, errors are preferably annotated. Annotating an error can include marking the error, providing an explanation of the error, providing a possible resolution, or adding any suitable supplemental information. An explanation of the error may use templating to use specific data from that unified log report. Annotation can similarly be used for other reasons such as showing log reports related to a subsection of a particular log report The log reports may have particular benefits to aiding in the process of providing customer support to users of the platform. Preferably, a customer care representative can be enabled to access and view log reports of an account. In one variation, a customer care agents is given privileges to view log reports with less sanitization than a customer account. For example, internal log information hidden from a customer agent may be viewable by the customer account. Additionally, the log report interface of a customer care agent may allow the agent to view the log reports as seen by the customer account. The method may additionally include establishing a synchronized browsing session between an account user and platform agent, which functions to allow the log report interface of a customer account to be at least partially controlled by a platform agent as shown in FIG. 1i. A synchronized browsing session may be established by the customer account or the platform agent entering a shared code. Alternatively, a platform agent may invoke the sharing session by obtaining the account name. The synchronized browsing session may allow a platform agent to pull up appropriate logs, mark or annotate a log report, or perform any suitable control of the log report to facilitate helping a customer resolve a problem.

The method may additionally include replaying at least a subset of events recorded in a log report. The log report preferably is made up of several events, at least some of which are actions originating from the platform (e.g., outbound SIP or HTTP communication). The actions that were performed to result in an event record can be replayed in its original format or alternatively in an augmented format (e.g., changing a parameter of the action). An event replay debugging tool may be provided to allow any level of action replay such as single action replay, stepping through actions, or replaying a set of actions from a starting point as shown in FIGS. 9A and 9B. For example, if an application encountered an error when the platform talked to an application server of an account holder, the account holder could replay the HTTP request made to the application server. The HTTP message originally sent can be resent to the application server URI. The application server will preferably make a response. This response can be compared to the original response. The method preferably additionally includes comparing two log reports as shown in FIG. 9B. In the replay version, an original version can be compared to the replayed version. Differences can be highlighted revealing what is added and what is missing between at least two versions. The log report comparison can additionally be applied to any two or more log reports.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the platform log storage system and an information sanitization engine. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
generating, by an application platform, internal log information associated with a first account of the application platform;
receiving, by the application platform, a request to access the internal log information associated with the first account; and
in response to receiving the request:
accessing, by the application platform, a first set of records in the internal log information that describe logged events attributed to at least a first internal Internet protocol (IP) address of the application platform and a second internal IP address of the application platform;
generating, by the application platform, sanitized log information by modifying the first set of records to describe the logged events as being attributed to a public IP address rather than the first internal IP address and the second internal IP address; and
returning, by the application platform, the sanitized log information in a response to the request.

2. The method of claim 1, further comprising:
executing a first process on behalf of the first account using the internal IP address of the application platform; and
executing a second process on behalf of the first account using the second internal IP address of the application platform.

3. The method of claim 2; wherein generating the internal log information associated with the first account of the application platform comprises:
generating a first record in the internal log information that indicates execution of the first process using the first internal IP address; and
generating a second record in the internal log information that indicates execution of the second process using the second internal IP address.

4. The method of claim 3, wherein generating the sanitized log information for the first account comprises:
modifying the first record in the internal log information to attribute execution of the first process to the public IP address; and modifying the second record in the internal log information to attribute execution of the second process to the public IP address.

5. The method of claim 1, further comprising:
detecting and classifying an error in the sanitized log information.

6. The method of claim 1, wherein generating the sanitized log information for the first account comprises:
condensing a set of individual log events in the internal log information into a summarizing event.

7. The method of claim 1, wherein the generating of the sanitized log information for the first account further comprises:
modifying the first set of records by removing a reference to the internal IP address.

8. The method of claim 1, further comprising:
transmitting a communication to a configured destination for at least one error classification, the communication being embedded with a link to the sanitized log information.

9. The method of claim 1, further comprising:
annotating the sanitized log information with supplemental information, the supplemental information including a recommended resolution to a detected error.

10. The method of claim 1, further comprising:
indexing properties of the internal log information, wherein the request to access the internal log information is a search query; and
determining a set of sessions of the internal log information that correspond to the search query.

11. An application platform comprising:
one or more computer processors; and
one or more computer-readable mediums storing instructions that, when executed by the one or more computer processors, cause the application platform to perform operations comprising:
generating internal log information associated with a first account of the application platform;
receiving a request to access the internal log information associated with the first account; and
in response to receiving the request:
accessing a first set of records in the internal log information that describe logged events attributed to at least a first internal Internet protocol (IP) address of the application platform and a second internal IP address of the application platform;
generating sanitized log information by modifying the first set of records to describe the logged events as being attributed to a public IP address rather than the first internal IP address and the second internal IP address; and
returning the sanitized log information in a response to the request.

12. The application platform of claim 11, the operations further comprising:
executing a first process on behalf of the first account using the first internal IP address of the application platform; and
executing a second process on behalf of the first account using the second internal IP address of the application platform.

13. The application platform of claim 12, wherein generating the intern log information associated with the first account of the application platform comprises:

generating a first record in the internal log information that indicates execution of the first process using the first internal IP address; and
generating a second record in the internal log information that indicates execution of the second process using the second internal IP address.

14. The application platform of claim 13, wherein generating the sanitized log information for the first account comprises:
modifying the first record in the internal log information to attribute execution of the first process to the public IP address; and
modifying the second record in the internal log information to attribute execution of the second process to the public IP address.

15. The application platform of claim 11, the operations further comprising:
detecting and classifying an error in the sanitized log information.

16. The application platform of claim 11, wherein generating the sanitized log information for the first account comprises:
condensing a set of individual log events in the internal log information into a summarizing event.

17. The application platform of claim 11, wherein the generating of the sanitized log information for the first account further comprises:
modifying the first set of records by removing a reference to the internal address.

18. The application platform of claim 11, the operations further comprising:
transmitting a communication to a configured destination for at least one error classification, the communication being embedded with a link to the sanitized log information.

19. The application platform of claim 11, the operations further comprising:
annotating the sanitized log information with supplemental information, the supplemental information including a recommended resolution to a detected error.

20. A non-transitory computer-readable medium storing instructions that, when executed by one or more computer processors of an application platform, cause the application platform to perform operations comprising:
generating internal log information associated with a first account of the application platform;
receiving a request to access the internal log information associated with the first account; and
in response to receiving the request:
accessing a first set of records in the internal log information that describe logged events attributed to at least a first internal Internet protocol (IP) address of the application platform and a second internal IP address of the application platform;
generating sanitized log information by modifying the first set of records to describe the logged events as being attributed to a public IP address rather than the first internal IP address and the second internal IF address; and
returning the sanitized log information in a response to the request.

* * * * *

UNITED STATES PATENT AND TRADEMARK OFFICE
CERTIFICATE OF CORRECTION

PATENT NO. : 11,539,601 B2
APPLICATION NO. : 16/545479
DATED : December 27, 2022
INVENTOR(S) : Nowack et al.

It is certified that error appears in the above-identified patent and that said Letters Patent is hereby corrected as shown below:

On the Title Page

On page 5, in Column 2, under item (56) "U.S. Patent Documents", Line 48, delete "2009/0022131" and insert --2009/0221310-- therefor On page 6, in Column 1, under item (56) "U.S. Patent Documents", Line 17, delete "2010/0029191" and insert --2010/0291910-- therefor On page 6, in Column 1, under item (56) "U.S. Patent Documents", Line 33, delete "2011/0014981" and insert --2011/0149810-- therefor In the Claims In Column 18, Line 54, in Claim 3, delete "claim 2;" and insert --claim 2,-- therefor In Column 19, Line 63, in Claim 13, delete "intern" and insert --internal-- therefor In Column 20, Line 30, in Claim 17, after "internal", insert --IP--

In Column 20, Line 59, in Claim 20, delete "IF" and insert --IP-- therefor

Signed and Sealed this
Thirty-first Day of October, 2023

Katherine Kelly Vidal
*Director of the United States Patent and Trademark Office*